US008775524B2

(12) United States Patent
Nissennboim

(10) Patent No.: US 8,775,524 B2
(45) Date of Patent: Jul. 8, 2014

(54) OBTAINING AND ASSESSING OBJECTIVE DATA RALATING TO NETWORK RESOURCES

(75) Inventor: Yoram Nissennboim, Haifa (IL)

(73) Assignee: Calling ID Ltd., Haifa (IL)

( * ) Notice: Subject to any disclaimer, the term of this patent is extended or adjusted under 35 U.S.C. 154(b) by 704 days.

(21) Appl. No.: 11/720,330

(22) PCT Filed: Nov. 27, 2005

(86) PCT No.: PCT/IL2005/001261
§ 371 (c)(1),
(2), (4) Date: May 28, 2007

(87) PCT Pub. No.: WO2006/056992
PCT Pub. Date: Jun. 1, 2006

(65) Prior Publication Data
US 2008/0010377 A1    Jan. 10, 2008

(51) Int. Cl.
*G06F 15/16* (2006.01)
(52) U.S. Cl.
USPC .............. 709/206; 709/226; 726/26; 726/27; 726/28; 726/29; 726/30
(58) Field of Classification Search
USPC ............. 709/206, 226; 726/26, 27, 28, 29, 30
See application file for complete search history.

(56) References Cited

U.S. PATENT DOCUMENTS

| 6,708,215 | B1 * | 3/2004 | Hingorani et al. | 709/229 |
| 6,996,778 | B2 * | 2/2006 | Rajarajan et al. | 715/734 |
| 7,818,809 | B1 * | 10/2010 | Sobel et al. | 726/26 |
| 2003/0084349 | A1 * | 5/2003 | Friedrichs et al. | 713/201 |
| 2003/0109272 | A1 * | 6/2003 | Mousseau et al. | 455/517 |
| 2004/0123157 | A1 * | 6/2004 | Alagna et al. | 713/201 |
| 2004/0139169 | A1 * | 7/2004 | O'Brien et al. | 709/217 |
| 2005/0198208 | A1 * | 9/2005 | Nystrom | 709/219 |
| 2005/0198534 | A1 * | 9/2005 | Matta et al. | 713/201 |
| 2006/0080735 | A1 * | 4/2006 | Brinson et al. | 726/22 |
| 2006/0168066 | A1 * | 7/2006 | Helsper et al. | 709/206 |
| 2006/0282795 | A1 * | 12/2006 | Clark et al. | 715/840 |

* cited by examiner

*Primary Examiner* — Thuong Nguyen
(74) *Attorney, Agent, or Firm* — Soroker Agmon

(57) ABSTRACT

In a network comprising a plurality of network resources and at least one directory server, the directory server containing information with a predetermined level of trust about the network resources, a method for automatically providing a user device with information about a network resource in communication with the user device. The communication includes address information about the network resource. The method comprises: automatically retrieving information from the directory server about the network resource in communication; and automatically executing at least one of a set of predetermined actions based on the retrieved information.

31 Claims, 9 Drawing Sheets

OBTAINING AND ASSESSING OBJECTIVE DATA RALATING TO NETWORK RESOURCES

FIELD OF THE INVENTION

The present invention relates to determining the ownership of a network resource, assessing the legitimacy of the network resource, and identifying sensitive data requested by, or sent to, the network resource via public networks such as Internet messaging systems and peer to peer communication.

BACKGROUND OF THE INVENTION

A first problem addressed by the present invention is providing a user with objective information about a network resource:

Users connect to a network—such as the Internet, a public switched telephone network (PSTN), or a cellular (mobile) telephony network—through a user-controlled network-connective client device—such as a personal computer, telephone, or cell (mobile) phone. The user has an interface to the device—such as web browser application, phone display, or man-machine interface For the purposes of this background discussion, we will focus on a connection to a popular type of network resource: a web site. The user's client device receives content, called a web page, from the web site and displays it in the web browser. The web page may include elements with content and characteristics called "objects", which in the context of the present invention can include text blocks, pictures, video clips, hyperlinks to other pages, editable fields, user-selected options, sub-pages (usually called "frames" in the art) that may themselves contain one or more objects, program code, or pointers to, and parameters for, programs to run on the client device etc.

An object may be retrieved by the web browser by connecting to a web site and receiving data from it concerning the object. The data could include instructions for adding more objects to the display by retrieving their data from the same site as the original object or from a different site. The user's client device typically includes an input device (keyboard, pen, mouse etc.) whereby he may interact with an object. For example, he might add characters to an input object, select one or more items in a selection object, select a file from his client device for transmission, use a microphone and/or a camera attached to his client device to generate a voice, video or multimedia clip for transmission, use a token to generate data for transmission, etc.

The data sent by the web browser has a destination that is defined (implicitly or explicitly) by the object that enables the data to be submitted. Since there are various addressing and name-masking schemes (e.g., aliases, re-direction, and encoded addresses), it is impossible for the user, using only the information available to him from the web browser, to determine with confidence the target he is transmitting to, the legitimacy of the target, the owner of the target, the physical location of the target, and whether the target really is intended for the purpose presented in the web browser or implied by the target address e.g., YourSaveSiteBank.

In addition, even where the site ownership appears to be legitimate, the user still needs to determine whether the site is an inappropriate target to transmit sensitive data to.

In addition, the user is rarely able to determine whether his transmission is done in a manner such that ensures only the authenticated target receives the information. While certificates exist for this purpose, the user needs a way to check the certificate's validity.

In summary, users are confronted with many combinations and permutations of seemingly easy-to-respond formats with reassuring text and most users are unable to detect untrustworthy targets. And even if the user knew how to obtain information about a suspect target, the user would not be sure how to use that highly technical information.

The present invention provides innovative filters, a rating algorithm, and a database that combine to provide the user with easy-to-understand information about a network resource, enabling them to comfortably proceed or abort the connection or communication.

An example of the need for the present invention can be seen in the case where encrypted confidential information is sent between an e-commerce server implemented as a web server and a browser device. The most common encryption protocol is the Secure Sockets Layer (SSL). This protocol requires a certificate issued for the server to be used. The certificate details are sent to the client and when the browser verifies the certificate, a lock icon is displayed in the browser. However it is not enough that the session is secure. The present invention answers the user's need to verify that the certificate for the session was issued by a trusted certificate authority, the certificate belongs to the company that owns the server, and that this company meets security and commercial standards so that the user should feel safe to send the information to it Another example of the need for the present invention involves unauthorized extraction of personal information, also referred to as "phishing". There are many ways used by web sites to convince naive people to disclose information about themselves. For example:
  the site use pages that looks like the pages used by a trusted resource
  the site owner might surreptitiously execute a program on the user's machine, where the program transmits to the server the keystrokes pressed by the user without the user's knowledge
  the site might have a name similar to that of a real site (like "micrusoft.com" instead of "microsoft.com"

Users must manually verify that none of these phishing strategies are being used against them when they enter their confidential information and submit it to the web server.

The present invention solves the problem, providing the user with enough information to decide whether to trust the e-commerce server (trust-related information). The present invention provides a program on the user's device that watches all the web pages accessed by the user and detects situations where the user is sending confidential information to a site that may misuse it.

A second problem addressed by the present invention is monitoring a user's networked device for unintended transmission of confidential data:

Users frequently transmit confidential information (passport number, social security number, bank account, PIN etc.) from their network-connective client devices to network resources. A user may not be aware that the network resource is an unauthorized destination. For example, when a user buys new software he is asked to register. The registration can be via electronic form (like email), via fax, printing a document and mailing it etc. If the registration form has fields like driver license number, social security number, date of birth, and the like, the naive user may fill it in and send it while being unaware of the consequences that may result.

The present invention provides pertinent information to help the user decide whether or not to proceed in transmitting confidential information to network resources, in particular when filling in forms that may be transmitted to entities for purposes other than the purpose for which the information was intended by the user, by adding a program on the user's device that watches the user's data entry activities (like typing data or sending data to other network resources) and detects situations where the confidential information may be sent to a network resource that might misuse it. The program can also scan the user's machine and storage devices for the existence of confidential information and help protect that information from being leaked.

A third problem addressed by the present invention is verifying the identity of a voice or messaging recipient:

When a user wants to send a message through a public service (electronic mail, fax, short message, instant message, multimedia message etc.) or he tries to establish a voice and/or data session—the sender or session initiator uses an address that he thinks belongs to the recipient. The address can be a telephone number, network address (like TCP/IP address), nickname used by the recipient in a global service, electronic mail address, etc. In many cases if the sender had known the real address and its owner he would not have sent the message. Sometimes the address includes a subtle typing error that fools the sender (the "microsoft" vs. "micrusoft" example), sometimes the interpretation of the address by the user is wrong, sometimes the address is an alias to a different address that was sent in order to confuse the sender, and sometimes the cost of sending the message to the address is high and if the user had known that he would not have sent it.

The invention uses directory servers to find the owner of the address and, when needed, more details about the owner—for example, whether it is a company or an individual, where he/it is located, whether there reports about the owner (e.g., better business bureau reports) etc.

Currently the label "phishing" is being used for extracting information using Web Browsers. Web "phishing" is a threat that occurs when a user gets a link to set his web browser to a page in a site which was designed to receive from him proprietary information. The site usually looks like the real site but it is either a proxy (performing man-in-the-middle function) or a fake site that can read all the data sent to the site by the user, including user name and password, credit card details, social security number, PIN, billing address etc. Some sites even use a combination of web pages, applications and users that manually execute functions that enable them a one-time access to an account over the web. If the user uses a common web browser to connect to the Internet and follows the link, he might either provide confidential or private information or let others login access to a restricted application.

Current solutions verify the legitimacy of a site based on the following:

Blacklists used to notify and block access: When a phishing message or a phishing site is detected they are added to a black list so that users may not get there. Firewalls and anti-spam software detect the messages or the connections to the phishing sites and stop them.

Education and guidelines: Users are requested to use manual algorithms and their acquired knowledge to manually detect a phishing message or a phishing site.

There are cases where, when a user sends a message or initiates a session, the information about the recipient is displayed on the sending machine. These solutions usually use "non-verified" information about the recipient's identity, meaning that the identity is not verified. There is no systematic method that checks the unverified information.

US Patent Application 20040123157, METHOD, SYSTEM, AND COMPUTER PROGRAM PRODUCT FOR SECURITY WITHIN A GLOBAL COMPUTER NETWORK, by Alagna et al. (2004) provides an information handling system that attempts to determine two things concerning whether a resource within a global computer network:

whether the resource is likely being misrepresented as a trusted resource whether the resource is a known trusted resource.

Alagna's invention is summarized in the following list:

a) determines the level of trust that can be to assign to a web site address and to addresses pointed to by the web site, including hyperlinks b) detects fields in the web site that include patterns of text or fields for requesting that a user provide sensitive data (for example, credit card details, bank account details, financial information)

c) determines properties of the web site and the web page (e.g. its size, its age, its layout, number of hyperlinks)

d) submits data to the web site and analyzes the results in order to determine if the site is a phishing site With reference to the preceding list, the present invention compares with Alagna's invention as follows:

a) Similarity: Both inventions maintain an internal database of known trusted and known trusted web sites. Some of the data is received from external resources (for example, the site bizrate.com).

Difference: Our invention uses different methods to automatically determine which sites are trusted and entrusted. The main method is maintaining what we refer to as the "calling ID" a site. The calling ID includes information like the location of the server, location of the owner, commercial details about the owner (type of organization, number of employees, income, financial status, year established, field of business etc), outsiders rating of the owner (financial or technology analysts rating, customers satisfaction rating, regulations authorities rating etc.).

We also use methods for detecting entrusted sites. For example, we check whether the site protects confidential information (like credit card numbers). If we determine that we can obtain unauthorized access to such information, we lower the site's trust rating.

b) We do not claim novelty in detecting such fields.

c) We do not claim novelty in determining such properties.

d) We use an innovative and unanticipated method of sending information to the network resource (e.g., web site) and analyzing the result. When a password-protected web site is not known to be trusted, our invention provides the option to send deliberately incorrect login information to check whether the web site accepts the information. If it does, this is a strong indicator that the web site is not to be trusted.

INNOVATIONS OF THE PRESENT INVENTION

In summary, it is a main object of the present invention to provide information about the connection target when a user connects to a network server or sends a message to a recipient or opens a communication session (voice, chat, etc.), thereby enabling the user to better know to whom he is connecting.

The information is provided in a useful, convenient format, and can include a trust rating. Some of the types of the information and examples of resources from which the present invention obtains the information are provided below.

Where an information type is obtained from an innovation provided by the current invention, this is noted:

name and location of physical host—obtained from a RIPE server name, location, and other details (e.g., business and financial status) of owner of physical host—obtained from a RIPE, white pages or yellow pages server name, location, and other details (e.g., business and financial status) of owner of address of target on network—obtained from a whois, white pages, or yellow pages server or crawled information whether outside access to secure information on the target is adequately blocked—this is an innovation obtained from a security server of the present invention whether there are suspicious inconsistencies in information provided by target—this is an innovation obtained from a security server of the present invention whether the target is listed on black lists or white lists—obtained from black or white list servers rating found in databases—obtained from commercial, government, nonprofit, popularity, and other servers calculated rating of target's authenticity, integrity, solvency, etc. based on any combination of the above When a network resource contains objects, each object can be handled as an associated network resource and the information about some or all of the associated network resources is considered as parts of the information about a single network resource It is another main object of the present invention to provide this information when the network is a telephony network and the user is connecting from a telephony device such as a telephone, cellular (mobile) phone, or other telecommunications end device.

It is another main object of the present invention to detect a scam target, such as a scam web page. The following steps can be involved:

break page into objects and test each object to determine whether a scam target is hidden in the page—this is an innovation of the present invention verify page address in multiple directory servers to negate possibility of attack on a directory—this is an innovation of the present invention detect connection using a distrusted protocol and avoid it when needed—this is an innovation of the present invention detect non-standard names or names similar to known names and avoid connection to such targets—this is an innovation of the present invention detect an insecure transaction (monitor web browser output for sensitive information and check whether session is secure)—this is an innovation of the present invention check name, location, and other details (e.g., business and financial status) of owner of each network resource that contributes to a page and decide accordingly if the network resource is trusted; when one or more network resources contributing to the page are distrusted, either decide that the page is distrusted or present details to user and let him decide—this is an innovation of the present invention check name, location, and other details (e.g., business and financial status) of owner of an SSL certificate—this is an innovation of the present invention detect an abnormal change in a network resource during a session—this is an innovation of the present invention calculate the trust rating of a web page and accordingly decide if it is trusted or distrusted check that an SSL certificate authority is approved on detecting a password being sent to the target, do the following (this procedure is an innovation of the present invention):

distinguish between registration and login warn if unknown target (hasn't been sent to before)

Enforce login only in secure session test target by sending wrong password

When the target has a known address (usually over the internet it is implemented as a unique IP address or a unique group of IP addresses) and a unique set of login parameters for login—detect when the set of login parameters is used to login to a target which is not the same known address.

It is another main object of the present invention to ensure confidentiality of information. This is done as follows (this procedure is an innovation of the present invention):

detect confidential information sent and retain that information for use in detecting whether that information is sent during an insecure session or sent to sites with a low trust rating bypass standard way keystrokes are handled in order to evade key loggers filter specific types of information from being sent while educating the user when it is OK to send such information

BRIEF DESCRIPTION OF THE INVENTION

There is thus provided, in accordance with some preferred embodiments of the present invention a In a network comprising a plurality of network resources and at least one directory server, the directory server containing information with a predetermined level of trust about the network resources, a method for automatically providing a user device with information about a network resource in communication with the user device, the communication including address information about the network resource, the method comprising:

automatically retrieving information from said at least one directory server about the network resource in communication;

automatically executing at least one of a set of predetermined actions based on the retrieved information.

Furthermore, in accordance with some preferred embodiments of the present invention, the method is implemented by a program installed on a processing unit of the user device.

Furthermore, in accordance with some preferred embodiments of the present invention, the method is implemented by a program installed on a processing unit of said at least one directory server.

Furthermore, in accordance with some preferred embodiments of the present invention, the method is implemented by a program installed on a processing unit connected to the network.

Furthermore, in accordance with some preferred embodiments of the present invention, the network resource in communication comprises a plurality of objects, at least some of the objects associated with a plurality of network resources.

Furthermore, in accordance with some preferred embodiments of the present invention, the retrieved information relates to some or all of the associated network resources.

Furthermore, in accordance with some preferred embodiments of the present invention, the network resource in communication comprises a server.

Furthermore, in accordance with some preferred embodiments of the present invention, the network resource in communication comprises an address for receiving messages.

Furthermore, in accordance with some preferred embodiments of the present invention, the network resource in communication comprises another user device.

Furthermore, in accordance with some preferred embodiments of the present invention, the user device or the network resource in communication is a telecommunication device.

Furthermore, in accordance with some preferred embodiments of the present invention, the user device or the network resource in communication is a mobile telecommunication device.

Furthermore, in accordance with some preferred embodiments of the present invention, the user device or the network resource in communication is a personal computer.

Furthermore, in accordance with some preferred embodiments of the present invention, said at least one of the set of predetermined actions is providing the user device with all or part of the retrieved information.

Furthermore, in accordance with some preferred embodiments of the present invention, said at least one of the set of predetermined actions further comprises providing the user device with a choice whether or not to continue communication with the network resource.

Furthermore, in accordance with some preferred embodiments of the present invention, the method further comprises:
   evaluating the retrieved information to determine trust-related information concerning the network resource in communication; and
   executing said at least one of the set of predetermined actions based on the trust-related information.

Furthermore, in accordance with some preferred embodiments of the present invention, evaluating the retrieved information to determine trust-related information concerning the network resource in communication is based on one or more parameters relating to the network resource in communication.

Furthermore, in accordance with some preferred embodiments of the present invention, said one or more parameters are selected from the group including: communication protocol; security level of the communication protocol; data received from the network resource in communication; type of information requested from the network resource in communication; physical location of the network resource in communication; owner information of the physical location and of the network resource in communication; information on the owner; name of the network resource in communication; inconsistency in information relating to the owner; status of any security certificates associated with the network resource in communication; history of the owner; information security problem related to the owner.

Furthermore, in accordance with some preferred embodiments of the present invention, said at least one of the set of predetermined actions comprises denying further communication between the user device and the network resource in communication.

Furthermore, in accordance with some preferred embodiments of the present invention, the method further comprises providing the user device with the trust-related information.

Furthermore, in accordance with some preferred embodiments of the present invention, the trust-related information comprises a trust rating.

Furthermore, in accordance with some preferred embodiments of the present invention, the method further comprises adjusting the trust rating when the network resource in communication is changed during the communication or when the owner of the network resource in communication is changed during the communication.

Furthermore, in accordance with some preferred embodiments of the present invention, the method further comprises evaluating the reliability of the directory server.

Furthermore, in accordance with some preferred embodiments of the present invention, the retrieved information includes one or more parameters relating to the network resource in communication.

Furthermore, in accordance with some preferred embodiments of the present invention, said one or more parameters are selected from the group including: communication protocol; security level of the communication protocol; data received from the network resource in communication; type of information requested from the network resource in communication; physical location of the network resource in communication; owner information of the physical location and of the network resource in communication; information on the owner; name of the network resource in communication; inconsistency in information relating to the owner; status of any security certificates associated with the network resource in communication; history of the owner; information security problem related to the owner.

Furthermore, in accordance with some preferred embodiments of the present invention, said at least one directory server comprises a plurality of directory servers, at least one of which contains information about the network resources characterized as being at least one of the following: domain Name Server; whois server; RIPE server; white pages server; yellow pages server.

Furthermore, in accordance with some preferred embodiments of the present invention, said at least one directory server comprises at least one security server, which detects whether a network resource leaves confidential information exposed, the detection comprising at least one of the following steps:
   using global network search engines and algorithms to find objects on the network resource that reveal credit card numbers, social security numbers, passwords connected to users names, personal identification numbers, ID numbers or other confidential information;
   analyzing the objects found and, if they do expose confidential information, recording this fact about the network resource;
   trying to access restricted application on the network resource using techniques for cracking username and password protections;
   if successful in accessing the application, and if the application includes confidential information, recording this fact about the network resource;
   getting reports from other network resources regarding whether a network resource, an object on that network resource, or a certificate of that network resource is a scam and recording this fact about the network resource; and
   scanning directory servers to find conflicts between different attributes of a network resource and, if found, recording this fact about the network resource.

Furthermore, in accordance with some preferred embodiments of the present invention, the method further comprises:
   prior to sending data from the user device to the network resource in communication, evaluating the data to determine if sending the data to the network resource complies with security criteria.

Furthermore, in accordance with some preferred embodiments of the present invention, evaluating the data comprises determining the type of the data.

Furthermore, in accordance with some preferred embodiments of the present invention, the method further comprises, if the type of data comprises confidential data, denying sending of the data.

Furthermore, in accordance with some preferred embodiments of the present invention, the method further comprises if the type of data comprises confidential data, providing the user device with a choice whether to send the data or not.

Furthermore, in accordance with some preferred embodiments of the present invention, the method further comprises sending test data consisting of incorrect information and verifying according to a response from the network resource if it is safe to send the data.

Furthermore, in accordance with some preferred embodiments of the present invention, the method further comprises:
prior to sending data from the user device to the network resource in communication, evaluating the data to determine if sending the data to the network resource complies with commercial criteria.

Furthermore, in accordance with some preferred embodiments of the present invention, there is provided, In a network comprising a plurality of network resources a method for automatically providing a user device with information regarding communication with a network resource, the method comprising: prior to sending data from the user device to the network resource in communication, evaluating the data to determine if sending the data to the network resource complies with security criteria.

Furthermore, in accordance with some preferred embodiments of the present invention, evaluating the data comprises determining the type of the data.

Furthermore, in accordance with some preferred embodiments of the present invention, the method further comprises, if the type of data comprises confidential data, denying sending of the data.

Furthermore, in accordance with some preferred embodiments of the present invention, the method further comprises if the type of data comprises confidential data, providing the user device with a choice whether to send the data or not.

Furthermore, in accordance with some preferred embodiments of the present invention, the method further comprises sending test data consisting of incorrect information and verifying according to a response from the network resource if it is safe to send the data.

Furthermore, in accordance with some preferred embodiments of the present invention, the data is directly delivered to an output device and to a network adapter, skipping an application process, whereby the network adapter transmits the data to the network resource.

Furthermore, in accordance with some preferred embodiments of the present invention, the data is directly delivered to an application process, skipping another application process that was initially intended to receive the data.

Furthermore, in accordance with some preferred embodiments of the present invention, the method further comprises comparing information received from a plurality of directory servers regarding the network resource in communication and, if the comparison finds conflicting information, performing at least one of the following:
reporting differences in the conflicting information;
disregarding the conflicting information;
deciding which of the conflicting information to use based on a predetermined algorithm;
let a user of the user device decide which of the conflicting information to use;
using information from all the directory servers, including the conflicting information;
retrieving data from other directory servers about an issue to which the conflicting information relates.

Furthermore, in accordance with some preferred embodiments of the present invention, there is provided, In a network comprising a plurality of network resources and at least one directory server, the directory server containing information with a predetermined level of trust about the network resources, a system for automatically providing a user device with information about a network resource in communication with the user device, the communication including address information about the network resource, the system comprising:
a processing device for automatically retrieving information from said at least one directory server about the network resource in communication; and for automatically executing at least one of a set of predetermined actions based on the retrieved information.

BRIEF DESCRIPTION OF THE FIGURES

The invention is described herein, by way of example only, with reference to the accompanying Figures, in which like components are designated by like reference numerals.

DETAILED DESCRIPTION OF THE INVENTION

A network resource in the context of the present invention is a physical or virtual device connected to a network that can receive and/or send data (text, audio, graphic and/or video). Examples of network resources are clients (defined later), E-commerce servers (e.g. web sites, FTP sites), messaging servers, and other similar resources.

Users connect to a network resource (for example, a web site) through a network (for example, the Internet) using a device such as a personal computer, telephone, mobile phone or other user controlled network-attached device. In the device they use an application such as web browser application, Telnet application, voice conversation or other built-in or programmatic user interface for connecting to a network resource. The device receives output from the application. Typically the output is displayed on the device's display system, although other output like audio, vibration etc. may be used. In most cases the output is a page. In the case where the network resource is a web site and the device is a computer and the application is a web browser, then the page is a web page.

Figure 1A:
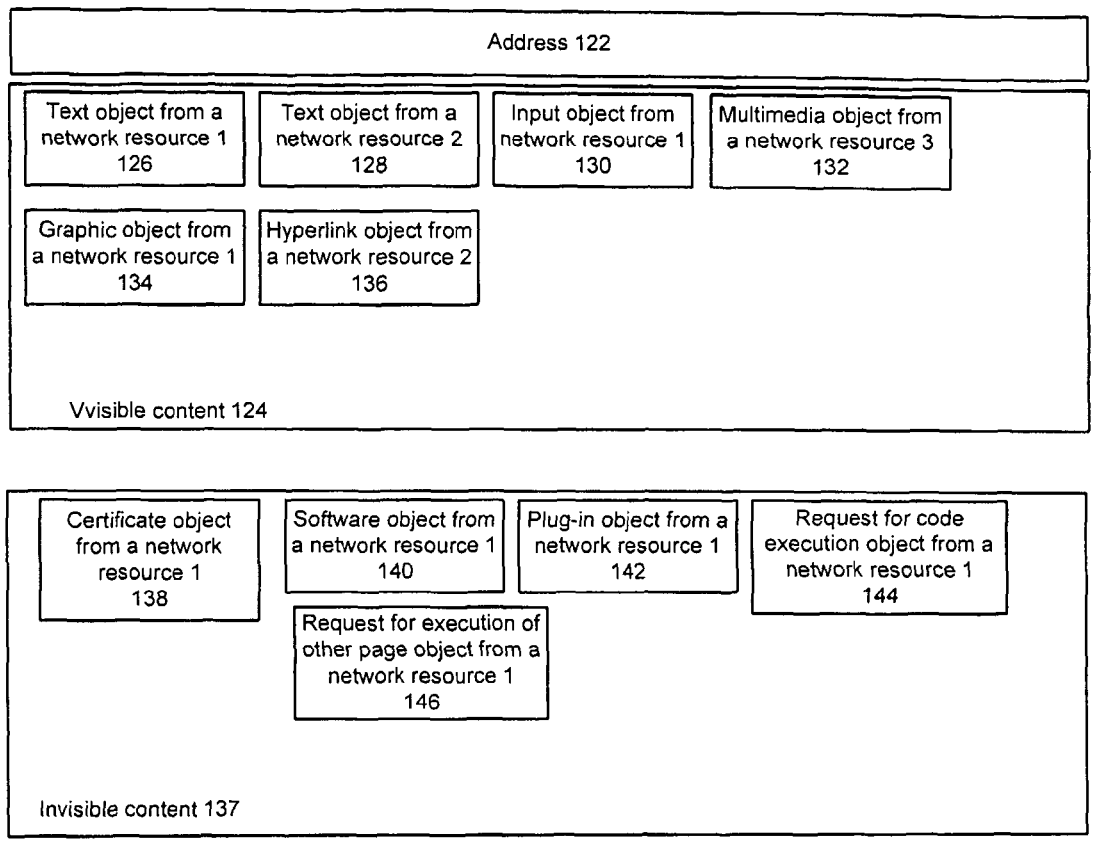
FIG. 1A illustrates a page in the context of a preferred embodiment of the present invention.

An example of a page is shown in FIG. 1A and includes an address (122), visible content (124) and invisible components. Address 122 may include the name of the network resource, a path inside the name to a web page, parameters (e.g. username, password), definition of other network resources that should be used in the page etc. Some of the data in the address may be encoded.

Visible content (124) includes one or more objects that an application that handles the page processes. Examples of visible content objects are texts (126 and 128), graphics (134), multimedia (132), hyperlinks to other pages (136), and input objects (130), which can comprise editable fields, selection fields, selection buttons, and other input options.

Invisible content 137 includes objects that do not contribute directly to the visible content but may cause visible display as a result of code execution. Examples of invisible page objects include executable code of programs (140), certificate for identification of the network resource and/or encryption of the data transferred between the network resource and the client (138), plug-in code that is installed on the client machine and may be executed later (142), and a request for execution of existing code (144) or for processing other pages (146). An object may be part of the data received in the original page or may be retrieved by the application by connecting to the same network resource or a different network resource and receiving data from it.

Some objects enable the user to send data to the network resource using his device's input means (keyboard, pen, mouse etc.). He might submit a sequence of characters to an input object, select one or more items in a selection object, submit a function key, select a file from the machine storage to be sent, use a microphone and/or a camera attached to the machine he uses to generate a voice, video or multimedia clip that will be sent, use a token that generates data that will be sent or use other input device to generate data to be sent. The data sent by the application has a destination which is defined (implicitly or explicitly) in the object that enables the data to be submitted.

"Calling ID" is a new concept introduced in this invention. The invention provides a calling ID for a network resource and a calling ID for a page.

The calling ID of a network resource provides information that enables a user to quantify how much to trust the network resource or page, such as whether or not to connect to it, whether to use information provided by it, or whether to send data to it. The calling ID information can comprise the name of the network resource, the network name of the network resource (e.g. domain name of a web site), the owner of the network resource and the relevant details about this owner (like company name, number of employees, money earned, year of establishment, financial status etc.), the location of the network resource and of the machine hosting the network resource in a case of a virtual network resource, the owner of the machine hosting the network resource, how trusted the network resource is by one or more information and auditing sources and other details that may be relevant about the network resource and its environment.

The calling ID of a page includes the calling ID of each network resource for each object in the page.

Figure 1B:
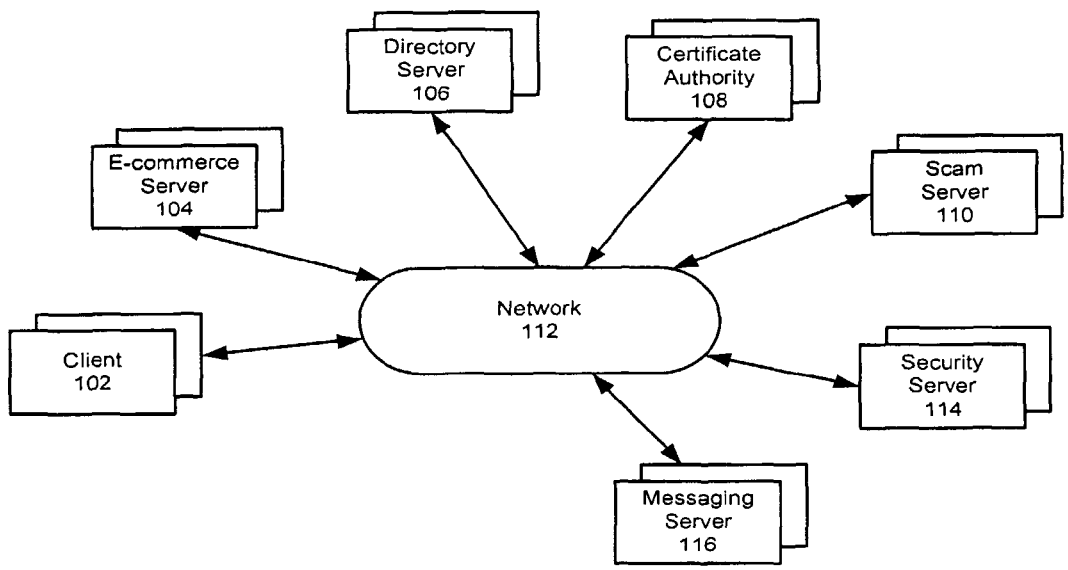
FIG. 1B is a block diagram of a global network including the security server software and calling ID directory server components of a preferred embodiment of the present invention.

FIG. 1B is a block diagram of a system that includes a global computing network 112 of a type for which the present invention is intended. Examples of network 112 are a Transport Control Protocol/Internet Protocol (TCP/IP) network such as the Internet, a wireless network such as a General Packet Radio Switching (GPRS) Network, a Public Switched Telephone Network (PSTN), a combination of such networks, etc.

The network shown in FIG. 1B is an example of in Internet implementation of network 112. Shown are a number of network resources that are connected by the network 112. The present invention is implemented on three of the resources shown, as security server 114, as one type of directory server 106, and as part of programming on client 102. The other network resources shown and described here can interact with the present invention—the operation of these other network resources is summarized herein for reference and is not modified when working with the present invention. Network resources connected to network 112 can include:

(a) One or more clients 101 and 102. Each client is described in detail in FIG. 2; the difference between client 101 and client 102 is the connection to network 112. While client 102 is connected directly to network 112, client 101 is connected through Calling ID router 118

(b) Optional one or more electronic commerce ("e-commerce") servers 104 (or other type of web server). Each e-commerce server is described in detail in FIG. 4

Figure 5:
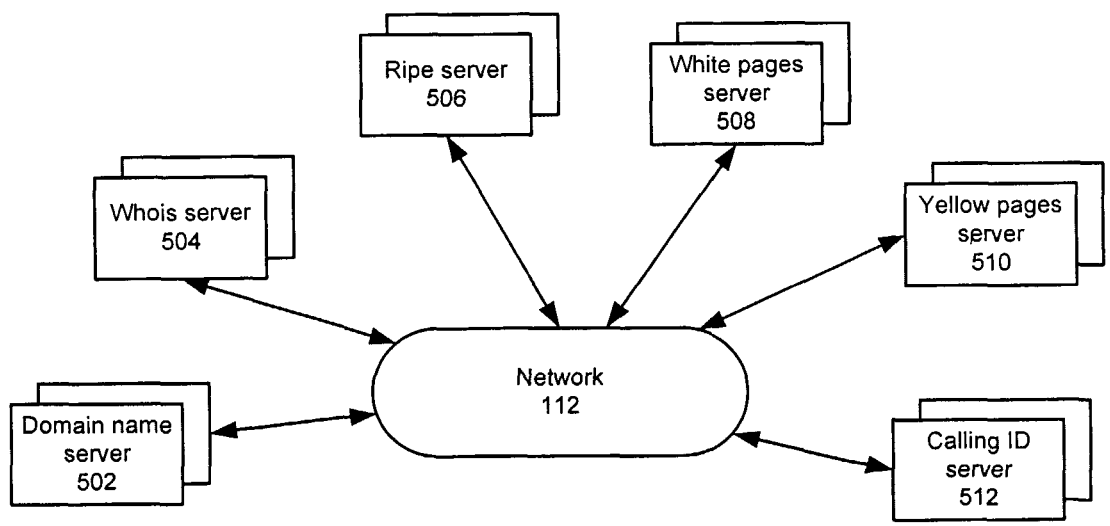
FIG. 5 is a block diagram of directory servers 106 including the calling ID directory server component of a preferred embodiment of the present invention.

(c) One or more directory servers 106 described in detail in FIG. 5

(d) Optional certificate authorities 108. A certificate authority provides the following functions:
   a. Issues certificates to e-commerce servers. Manages the certificates by extending their validity or invalidating them based on requirements from external sources and based on time.
   b. When a client 102 receives a certificate from e-commerce server 108, it may request that the certificate authority confirm whether the owner of the certificate is the one that the certificate was issued to and that the details in the certificate are those defined when the certificate was issued (e) Optional scam resources 110 (described below).

(f) Optional one or more Security servers 114, which comprise part of a preferred embodiment of the present invention. These servers 114 are located at one or more locations on the network. Their task is to aid the use of the network by identifying trusted network resources and prevent use of distrusted network resources. Security servers 114 perform the following functions:
   a. Detect e-commerce servers that leave confidential information exposed. This is executed by the following algorithms:
      i. Use global network search engines and algorithms to find pages on e-commerce servers that reveal credit card numbers, social security numbers, passwords connected to users names, personal identification numbers (PIN), ID numbers and other information that should be kept confidential. Analyze the pages found and, if they do expose confidential information, adjust accordingly the appropriate attributes in the calling ID of the e-commerce server to which the pages belong.

ii. Try to access restricted applications on e-commerce server using known techniques for cracking username and password protections. If the authentication is breakable and the application that allowed the access includes confidential information, adjust accordingly the appropriate attributes in the calling ID of the e-commerce server.

b. Get reports from other network resources (either reports known to be reliable or reports that require an automatic or human process to verify them) that indicate that a network resource or a specific page or a certificate is a scam resource. Adjust accordingly the appropriate attributes in the calling ID of the network resource or web site.

c. Scan directory servers to find conflicts between different attributes of a specific resource. For example, if the telephone number of a resource owner has country code or city code different than the location of the owner, if a commercial attribute is used for a non-profit organization etc. When a conflict is found adjust accordingly the appropriate attributes in the calling ID of the site.

(g) Messaging server (116) is a device that receives messages from clients and optionally from other messaging servers and handles them according to one or more of the following options based on policies:

a. Forward messages to other messaging servers either as-is or after conversion (e.g. convert a text message to a fax, convert a voice message to an electronic mail message and add the voice as a file attached to the message)

b. Forward messages to the client that should receive the message c. Ignore the message with or without generating a notification to the sender and/or to the recipient d. Store the message waiting for the client to ask to receive them e. Send the message to a security server (h) Calling ID router 118 is a device through which a client 101 is connected to a network 112. Calling ID router 118 implements some or all of the functionalities of the present invention that are otherwise performed by client 102 when it is connected directly to network 112. In other words, the client-side functions of the present invention can be implemented in two ways, depending on the embodiment: solely by the client, as in the case of client 102, or partially or fully by calling ID router 118, as in the case of client 101. These client-side functions include, for example: new connection manager (604) providing and calling ID information to the client, or automatically blocking sessions.

Each network resource (such as client, e-commerce server, directory server, certificate authority, messaging server and scam resource) includes a network interface for communicating with network 112 (e.g., outputting information to, and receiving information from, network 112). The network transfers the communication to the other resources. The network determines the recipient for each communication by detection of an address provided by the network resource initiating the communication. The network 112 may convert communication protocols to enable communication between two resources communicating differently with it (e.g. when one resource is communicating with voice interface and another resource communicating with a messaging system, the network converts the voice to a file, adds message headers and transfers the message to the messaging system with voice attached file)

Examples of communication between the resources are:

(a) a client connecting to another network resource (such as e-commerce server, directory server etc.) to receive information, transfer information and execute transactions (b) a client or a server receiving messages and sending messages directly with other clients or through one or more messaging servers (118)

(c) a client connecting to another client for direct communication via voice, video, text and/or graphics One of the characteristics of scam resource 110 is that it tries to appear to a client 102 as a trusted network resource. The scam resource use one of more methods to achieve that goal, such as:

(a) use a name similar to a name of a trusted resource (b) use page that looks like the pages used by trusted resource (c) integrate objects inside a trusted resource (d) suggest a special deal to users without exposing the fact that the deals are hoax and the information or payments received from the users will be used without providing the expected results the users paid or sent information for (e) send a message that looks as if it was originated by a trusted resource asking the user to connect to a page to send information or reply by a message or by opening a session with a scam resource (f) make a change in a directory server or replace a directory server so that when a user connects to another network resource the connected party is a scam resource.

Figure 2:
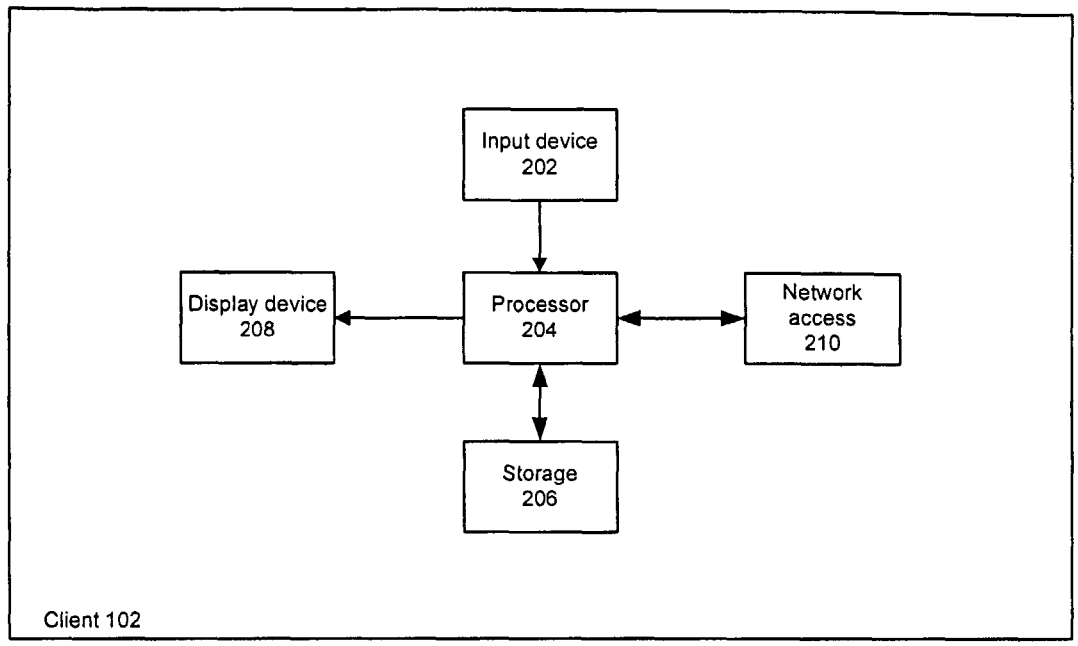
FIG. 2 is a block diagram of a client 102 in a global network.

(g) during a communication session that the user has with a network resource replace the real resource and communicate with the user that thinks that his party is the real resource (h) without user awareness executing programs on users machines that collect information and send it to the scam resource (i) connect to e-commerce servers and try to receive confidential information about users that sent information to the ecommerce server (j) any other way that convinces the user that the resource is trusted FIG. 2 is a block diagram of a client 102 in a global network 112. (There is no special adaptation of client 102 at this level for the present invention—however there is at the more specific level described in FIG. 3.) Client 102 includes an input device 202 (e.g. keyboard, mouse, microphone etc.) whereby a user can generate and submit data to network resources and can control the client. The input device is connected to a processor 204 running software programs. The processor sends display commands to a display device 208 in order to display texts and pictures that the user will see (or sends output commands to another output device, such as a voice synthesizer). The processor 204 uses storage 206 (e.g. disk) to store data and applications. The processor uses network access 210 (known also as network adapter) to connect to other network resources through network 112 and after connecting sending data to them and/or receiving data from them. Other devices may also be connected to the client. Such devices include camera, audio devices etc. They are not included in the figure to simplify the picture.

Figure 3:
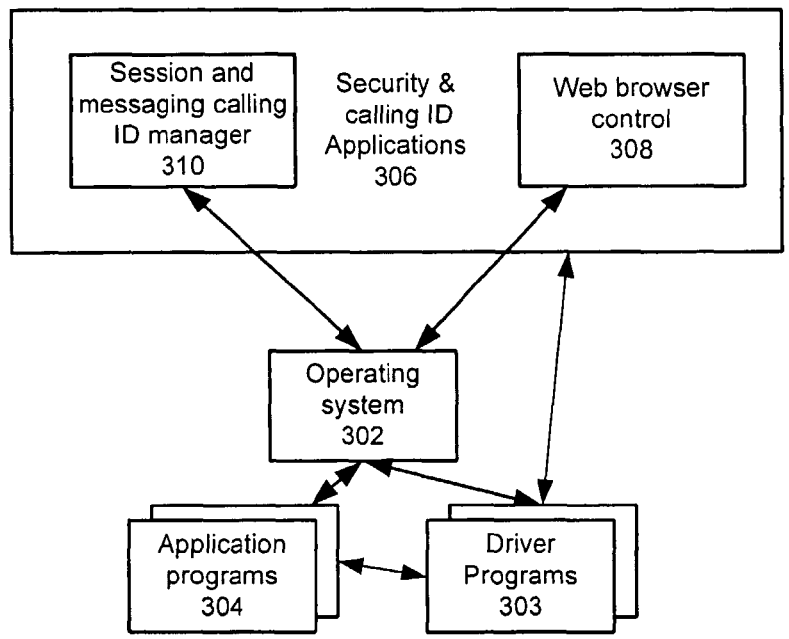
FIG. 3 is a block diagram of client software programs including the client software components of a preferred embodiment of the present invention.

FIG. 3 is a block diagram of the client software programs that the client processor 204 executes.

There are four classes of programs described in the figure:

(a) Operating system programs 302 that uses Driver Programs 303 to interface with external components outside of processor 204, such as input devices 202, display device 208, etc.; The operating system executes other programs; manage communication between programs; etc.

(b) Driver programs (303) like keyboard, mouse, display and communication, that usually control the hardware devices based on instructions received from the operating system (302) but, in certain situations, skip the operating system and receives instructions from application programs (304) or from Security and Calling ID applications (306) and based on these instructions transfer the inputs directly to the application programs (304) or Security and Calling ID applications (306) and either send wrong data or does not send any data to the operating system (302)

(c) Application programs 304 like web browser applications, messaging applications, voice and multimedia applications, data communication (chat) applications, office applications (like a word processor) etc.

Figure 4:
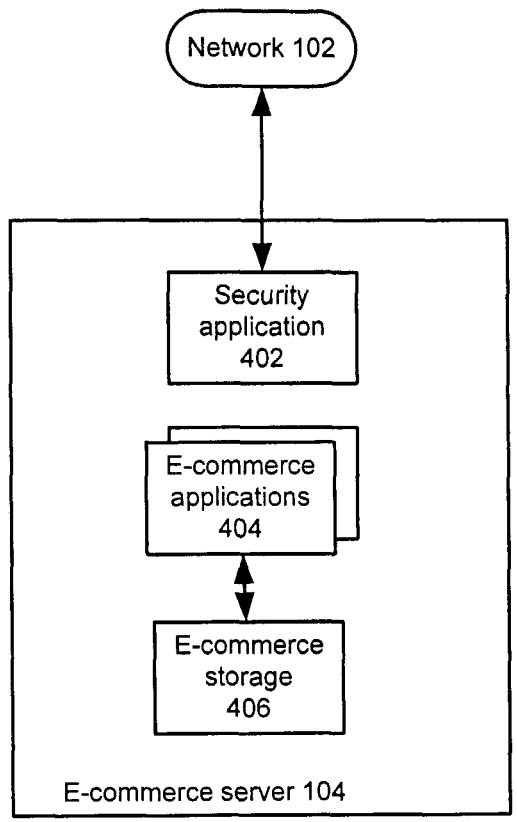
FIG. 4 is a block diagram of an e-commerce server 104.

(d) Security and calling ID applications 306 (part of a preferred embodiment of the present invention), which protect the user from the problems described earlier in this specification (e.g., obtaining objective information about a network resource, protecting confidential information, and verifying the identity of a recipient), displays a network resource's calling ID when relevant, and stops communication (automatically or after user confirmation) when needed. In particular, the security and calling ID applications include the following applications:

a. Web browser control 308, which adds security and calling ID functions to a web browser application. The web browser control is described in FIG. 6 b. Session and messaging calling ID manager 310 which adds security and calling ID functionality to messaging, chat, voice and multimedia applications. The functions performed by this process are:

i. When one of the application programs 304 tries to generate a message or to send a message (such as electronic mail, instant message, voice message, multimedia message) the recipients (one or more) of the message are detected. Some or all the parameters of the calling ID of the recipients are retrieved. The process can assign a trust rating to the recipient by calculating a formula that assigns weight to each parameter. The process may display to the user relevant calling ID parameters and the calculated rating. The rating may be translated into a signal for the user that can be visual, audible, etc. The process may alert the user when the trust rating parameter of the calling ID of a recipient is below a defined threshold. The process may remove (block) a recipient from the list of message recipients or even avoid sending the message when the recipient calling ID meets some criteria.

ii. When one of the application programs 304 tries to open a session with a recipient (such as voice chat, multimedia chat, data chat, whiteboard) the recipients (one or more) of the session are detected. Some or all the parameters of the calling ID of the recipients are retrieved. The process may calculate rating of the recipient by calculating a formula that assigns weight to each parameter. The process may display to the user relevant calling ID parameters and the calculated rating. The rating may be translated to a signal for the user that can be graphics, sound etc. The process may alert the user when the trust rating parameter of the calling ID of a recipient is below a defined threshold. The process may remove recipient from the message recipients or even avoid sending the message when the recipient calling ID meets some criteria FIG. 4 is a block diagram of e-commerce server 104, the e-commerce server does not require modification for use with the present invention. The interface between network 112 and e-commerce server 104 is managed by security application 402. This application hides confidential information in the e-commerce storage from unauthorized users. Note: If an unauthorized user can access parts of the confidential information, this is a security hole and is noted in the e-commerce server calling ID maintained by the present invention and may cause the server to be considered distrusted.

E-commerce application 404 executes all business and informational functions of the ecommerce server.

E-commerce storage 406 is used to store both public and confidential information.

FIG. 5 is a block diagram of directory servers 106. There are several directories used in the network represented by a group of servers each connected to the network and providing answers to requests coming from network resources. The requests include one or more indexes for retrieving the answers. Directory servers 106 may be synchronized (when one is updated it updates the other directory servers performing the same function and the change propagates to all the directory servers).

In the context of the present invention, directory servers 106 serve as resources for calling ID server 512, which itself is a new type of directory server.

Examples of types of directory servers are:

(a) Domain Name Server (DNS) 502—converts a network address (like TCP/IP address in the format x.x.x.x) to a name known as representing that address (like www.domain_name.com) and converts a name of an address to its network address (b) Whois server 504—provides information about the owner of network resources (usually owner of a domain). The information may include details of the person who owns the network resource, if it is an organization the details of the company and the contact person in the organization. The information may include other details like specific contact people for administration, technical and financial requests.

(c) RIPE server 506—provides information about the physical details of the network resources. This information includes physical location of the network resource and name and location of the owner of the network resource (in some cases this is the owner of the domain, in other cases it is the organization providing network hosting services)

(d) White pages server 508—provides information about individuals. The information may include the address of the individual (private or business), phone numbers (line and wireless), fax, messaging addresses (for electronic mail, instant messages etc.). It may include attributes of the individual like sex, age, marital status, hobbies, occupation, financial status etc.

(e) Yellow pages server 510—provides information about organizations. The information may include the address (or addresses in multi-site organization), phone numbers of the organization and of contact people in the organization, number of employees, revenue, income, financial status, year established, businesses that the company is involved in etc.

Calling ID server 512—(part of the present invention) provides information about a network resource that a user can use in order to decide whether or not to connect to the network resource, to use information provided by it, or to send information data to it.

Figure 6:
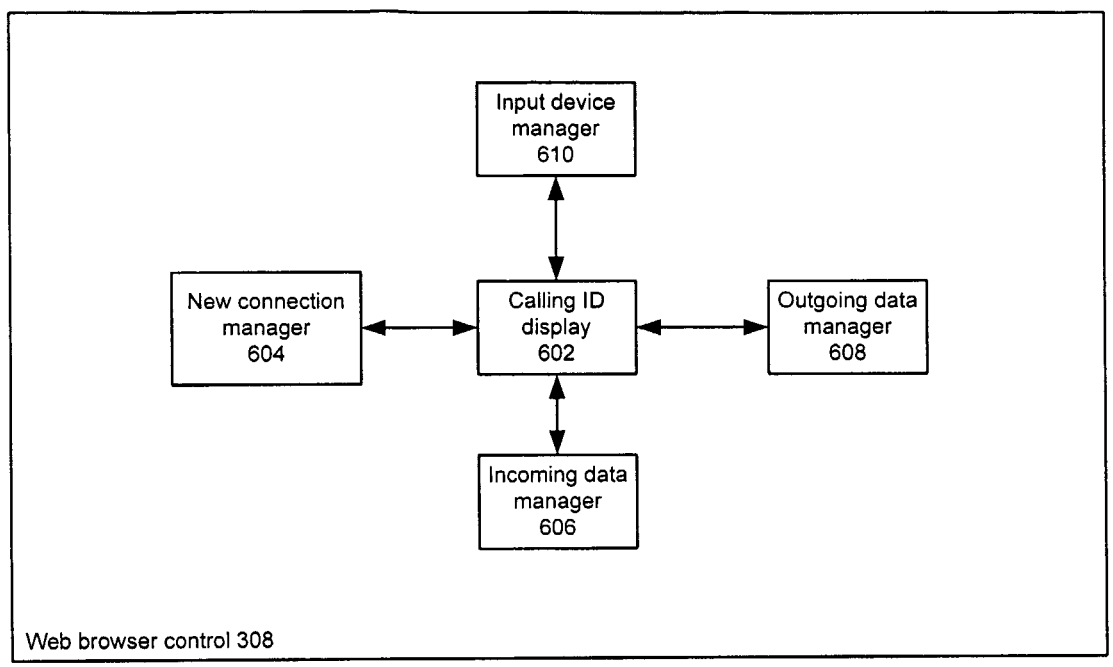
FIG. 6 is a block diagram of a web browser control in accordance with a preferred embodiment of the present invention.

FIG. 6 is a block diagram of a web browser control 308 in accordance with a preferred embodiment of the present invention (see also FIG. 3). Web browser control 308 receives from the operating system 302 and from the web browser application knowledge about the input from user and the network 112, the display content 208 and the output which should be stored in storage (206) and/or sent to the network 112. Web browser control 308 may change the input, change the output, add an image and/or text to the display (or other output), stop communication with the network, or read or write data from or to the storage Web browser control 308 has the following components:
 (a) Calling ID display 602 displays for the user part or all the data in the calling ID of the page the web browser is either currently or about to display/execute. In addition to the page's calling ID, the calling ID for each network resource associated with an object in the page may also be displayed. The display may include color, graphics including animation and/or sound effects to explain to the user elements of the calling ID, including the trust rating. In a preferred embodiment of the present invention, the network resource calling ID information provided to the user can be provided as directory assistance, for example, the address, telephone number and fax number of the network resource or its owner
 (b) New connection control 604 is a process executed when a web browser tries to connect to a network resource. It is described in FIG. 7
 (c) Incoming data control 606 is a process executed when data is coming from a network resource to the web browser. It is described in FIG. 8
 (d) Outgoing data control 608 is a process executed when the web browser tries to send data to a network resource. It is described in FIG. 9.
 (e) Input device manager (610) is a process executed when the web browser receives user input. It is described in FIG. 11

Figure 7:
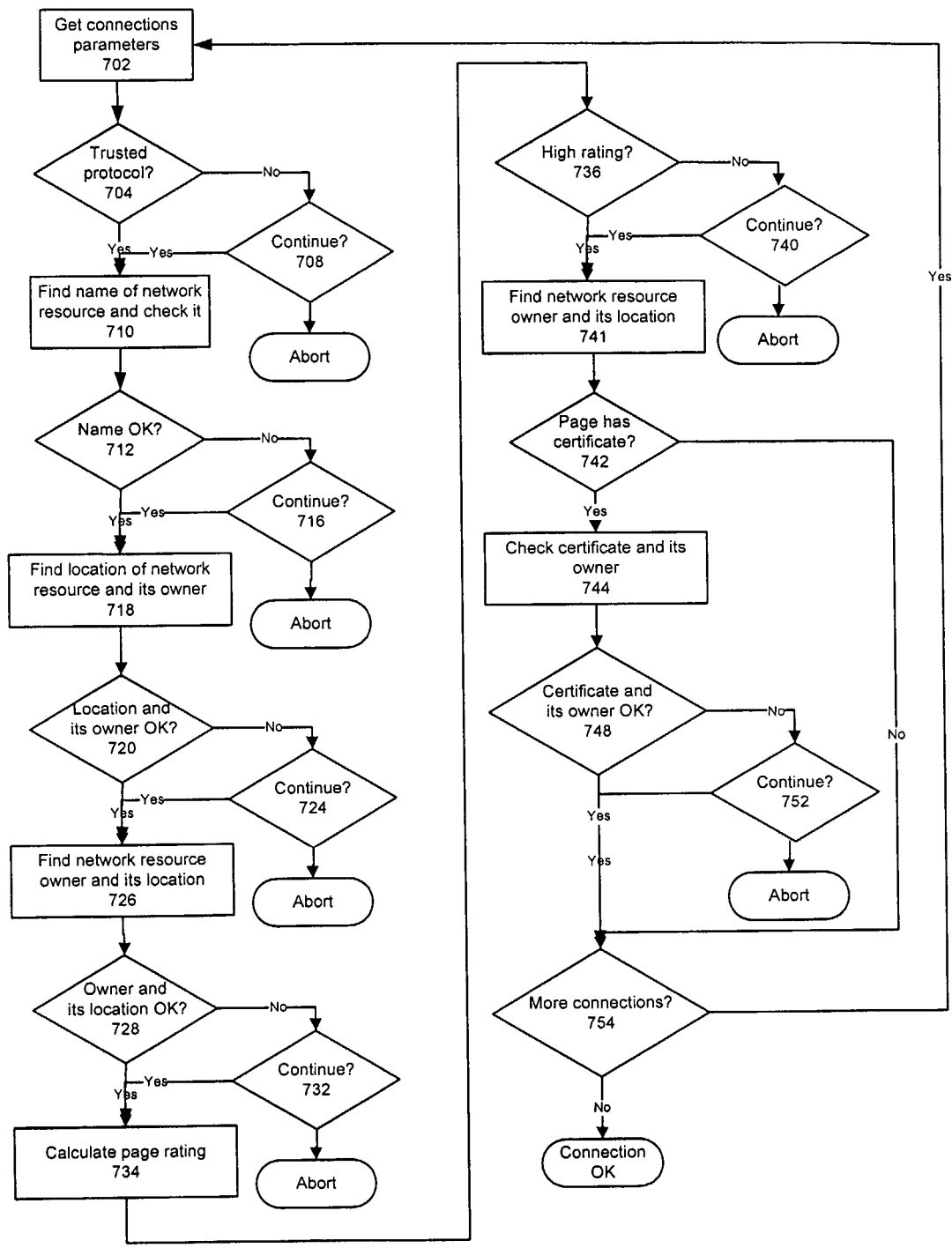
FIG. 7 is a flowchart of the new connection control process in accordance with a preferred embodiment of the present invention.

FIG. 7 is a flowchart of the new connection control process 604 (see FIG. 6) in accordance with a preferred embodiment of the present invention. There are several steps described. However not all the steps must be executed and the order between the steps may be changed.

In step 702 the process receives as input from the web browser application the parameters relevant for the connection. The parameters include network name and/or network address of the network resource, protocol for communication (e.g. TCP port 80, non-secure HTTP protocol), and may include path in the network connection for a specific page, login parameters, negotiation parameters etc. The network address is calculated from the network name if the name is provided. Sometimes one or more external directory servers 106 is used to verify that the address is correct.

Step 704 describes a check of the protocol. The check verifies that the protocol used is one of the protocols approved as "trusted". The list of trusted protocols can be privately defined by the client user and/or by one or more external sources that are approved by the client user. When the protocol is not trusted, the control or the user decides whether to continue 708, according to one of the following policies:
 (a) The client user is notified and he should manually choose to allow the connection or to abort it
 (b) The client user is notified and the connection is automatically allowed
 (c) The client user is notified and the connection is automatically aborted
 (d) The connection is automatically allowed
 (e) The connection is automatically aborted In step 710 the name of the network resource is detected and also, when relevant, the exact path to a page in the network resource is detected. If needed, directory servers 106 are used to find the information.

Step 712 describes a check of the name. If the name of the network resource is found in a list of distrusted network resources, or the page is found in a list of distrusted pages, or the name of the network resource does not meet a standard of naming (e.g. it includes characters that are not standard, its size or its type are not standard) or there is a conflict between the address associated with a name found in one directory or list and the associated address of the same name on another directory or list then the control or the user decides whether to continue 716, according to one of the following policies:
 (a) The client user is notified and he should manually choose to allow the connection or to abort it
 (b) The client user is notified and the connection is automatically allowed
 (c) The client user is notified and the connection is automatically aborted
 (d) The connection is automatically allowed
 (e) The connection is automatically aborted In step 718 the location of the network resource and the owner of the location are detected. If needed, directory servers 106 are used to find the information.

Step 720 describes a check of the location and the owner of the location. If the location of the network resource is not found, or found in a list of distrusted network resource locations (for example a list of suspect countries), or the owner of the location is not found or the owner of the location is detected as distrusted then the control or the user decides whether to continue 724, according to one of the following policies:
 (a) The client user is notified and he should manually choose to allow the connection or to abort it
 (b) The client user is notified and the connection is automatically allowed
 (c) The client user is notified and the connection is automatically aborted
 (d) The connection is automatically allowed
 (e) The connection is automatically aborted In step 726 the owner of the network resource and the owner's location are detected. If needed, directory servers 106 are used to find the information. In this step several exceptions are taken into consideration:
 (a) If in at least one directory the name of the owner is a name of a provider that hides identity of other owners—mark the owner as an entity that hides its identity
 (b) If the owner is known as one that provides client services (like Internet service provider) and accordingly the network resource is owned by a client and not by the owner—set the owner as "unknown"
 (c) If the owner is unknown but it is likely that the network resource location owner is also the owner—consider the network resource location owner as the owner Step 728 describes a check of the owner of the network resource. If the location of the network resource owner is not found, or found in a list of distrusted owners of network resources (for example location is in a suspect country, owner is on a list of suspected criminals, etc.), then the control or the user decides whether to continue 732, according to one of the following policies:

(a) The client user is notified and he should manually choose to allow the connection or to abort it
(b) The client user is notified and the connection is automatically allowed
(c) The client user is notified and the connection is automatically aborted
(d) The connection is automatically allowed
(e) The connection is automatically aborted Step 734 the rating of the network resource is calculated. (If desired, the client can recalculate the rating in response to various causes, for example if a parameter changes). The inputs for the calculations are based on one or more of the following parameters:
(a) Parameters defined for the calling ID of the network resource including attributes that were defined for it
(b) Parameters found in the steps 702, 710, 718, 726
(c) The data received from the network resource. This data may include programs to run on the client (like programs that send keystrokes the user types), specific terms in texts to be displayed, specific texts that are found in graphic elements that should be displayed, texts to be displayed with specific attributes (e.g. a disclaimer written in unreadable font), attributes of input fields (especially when there are fields with suspected attributes, e.g., where there is an input field with attribute of regular text but when the user tries to enter text in that field the text is not displayed)

The weight of the inputs and how they are used to calculate the rating can be defined by the client user and/or by one or more external sources that are approved by the client user. The calculation generates a numerical rating of how trusted the network resource is considered.

In step 736 the trust rating of the network resource is adjusted according to the usage of the page (defined by outgoing data control 608). The result may be that the network resource is either trusted, distrusted or something in between that requires user decision. If found distrusted then the control or the user decides whether to continue 740, according to one of the following policies:
(a) The client user is notified and he should manually choose to allow the connection or to abort it
(b) The client user is notified and the connection is automatically allowed
(c) The client user is notified and the connection is automatically aborted
(d) The connection is automatically allowed
(e) The connection is automatically aborted Step 742 executes a process that checks if the network resource sends a certificate to the client.

When a certificate is sent, step 744 checks the certificate that was sent. The check includes one or more of the following steps:
(a) Check if the certificate is valid (e.g. validation fields shows that it is invalid, missing fields required for validation, expiration date expired etc.)
(b) Check that the issuer of the certificate is trusted. This check may include checking with a directory server 106 and with one or more trusted certificate authorities 108
(c) Check with the certificate authority that the certificate is OK
(d) Check that the details of the certificate owner exist and match the details of the network resource owner
(e) If the previous page had a connection to a network resource with a certificate, check that the certificate was not changed between the previous page and the current page If one or more of the checks return negative results, one of the following policies is used:
(a) The client user is notified and he should manually choose to allow the connection or to abort it
(b) The client user is notified and the connection is automatically allowed
(c) The client user is notified and the connection is automatically aborted
(d) The connection is automatically allowed
(e) The connection is automatically aborted Step 754 is presented for clarification to describe that all the steps defined above may be an iterative process which is executed for all or selected network resources used in the page.

Figure 8:
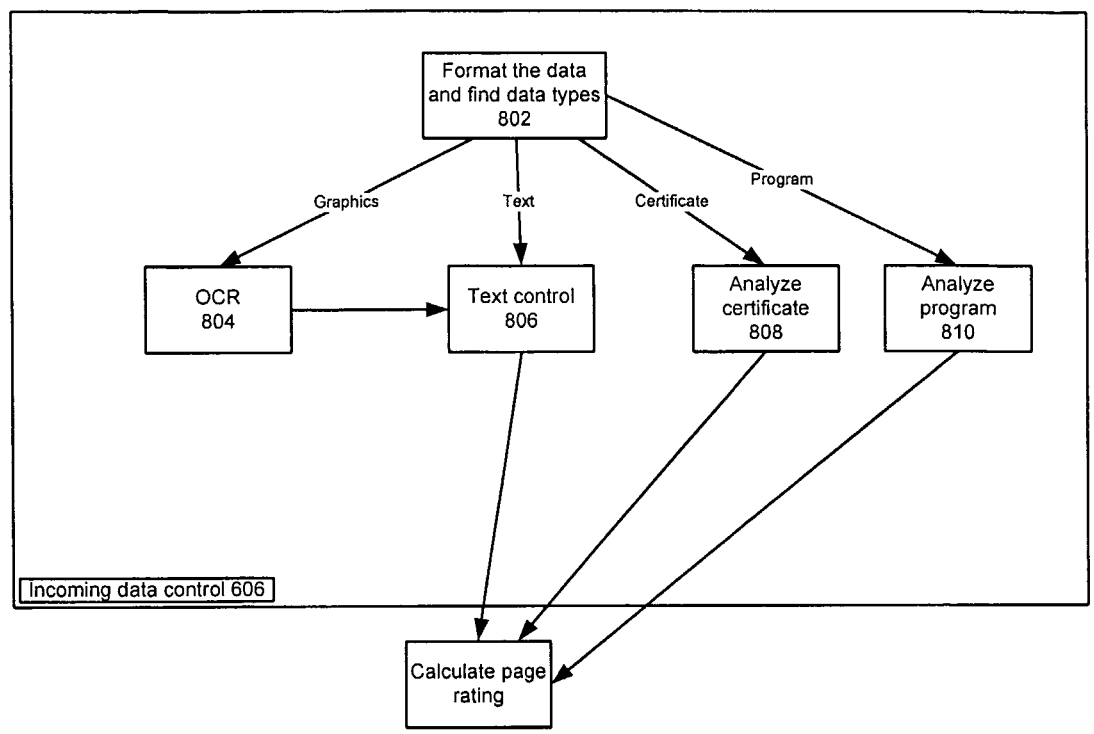
FIG. 8 is a flowchart for the incoming data control process in accordance with a preferred embodiment of the present invention.

FIG. 8 is a flowchart describing the incoming data control process 606 (see FIG. 6) in accordance with a preferred embodiment of the present invention. The process receives as input a stream of unstructured data or a data structure. As an example, the data is coming from a web page in order to be processed by the web browser.

Step 802 formats the stream of unstructured data to a data structure. The format process distinguishes between data elements and assigns a data type to each element. The process continues according to the different data types as follows:

Step 804 is executed when a graphic element is received. The graphic element can be checked using optical character recognition (OCR), thereby detecting any text in it. The process continues in step 806

Step 806 is executed when a text object is received. The text and its presentation attributes (e.g. hidden, blinking) are transferred to connection control process 604 (FIG. 7), which may re-execute the rating of the network resource.

Step 808 is executed when a new certificate is received. The certificate details are sent to connection control process 604 (FIG. 7), which may re-execute the rating of the network resource Step 810 is executed when a program is received. The program may be analyzed for a trust rating using one or more of the following:
(a) If the program contains code known as hostile it is considered distrusted
(b) If the program does not meet security guidelines (like restricted access to computer resources) it is considered distrusted
(c) If the program tries to capture input activities of the user and may submit these activities to an external source it is considered distrusted
(d) If the program tries to communicate with an external source other than the network resource that sent it—it may be considered distrusted
(e) If the program consumes too many resources on the client machine (CPU, memory, I/O, network etc.) it may be considered distrusted
(f) If the program generates one or more new pages (for example, pop-ups) it may be considered distrusted
(g) If the program generates one or more new pages and the new page contains distrusted resources it may be considered distrusted If the program was found to be distrusted, step 734 in connection control process 604 (FIG. 7), may be executed.

Figure 9:
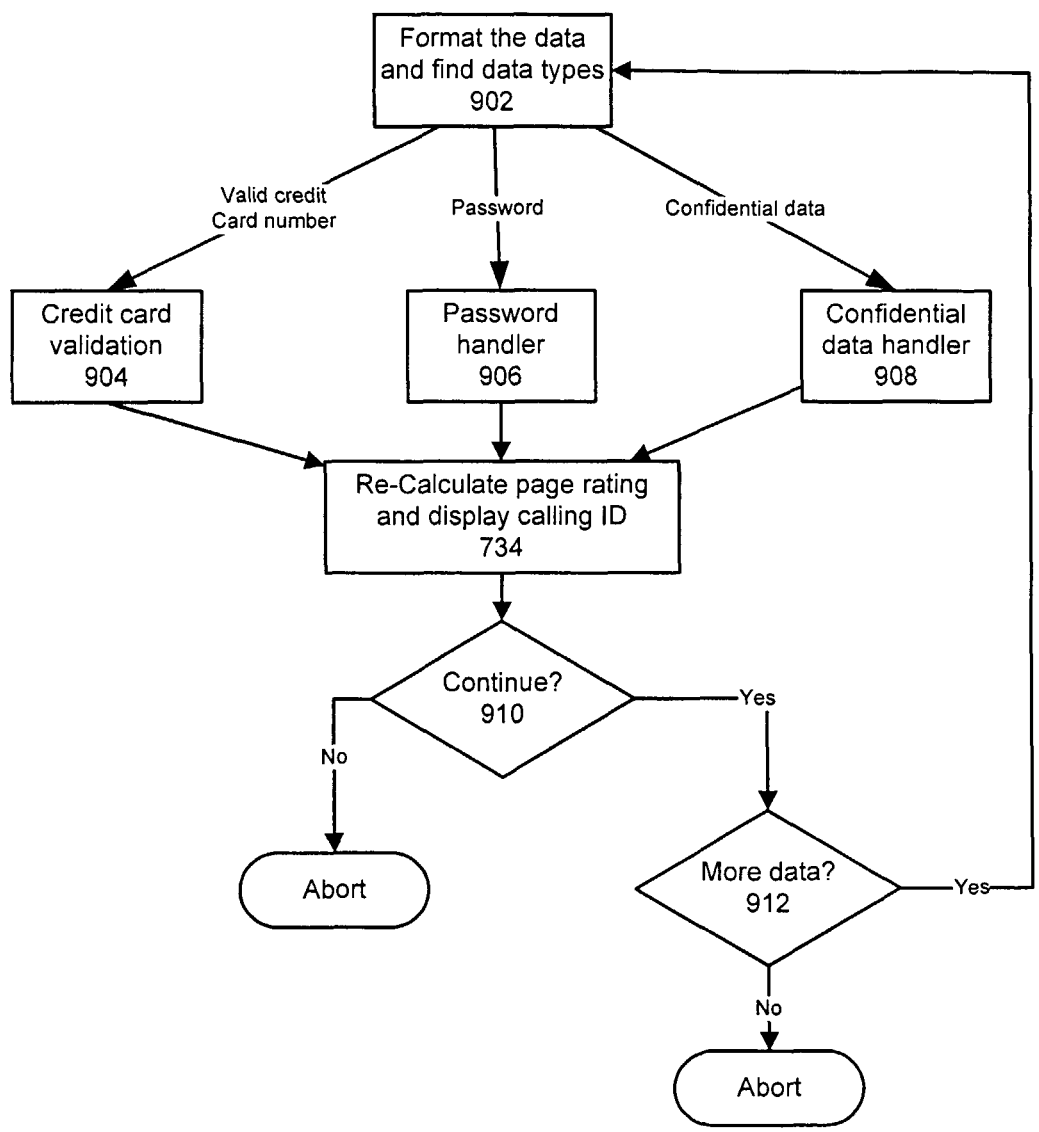
FIG. 9 is a flowchart for the outgoing data control process in accordance with a preferred embodiment of the present invention.

FIG. 9 is a flowchart describing the outgoing data control process 608 (see FIG. 6) in accordance with a preferred embodiment of the present invention. The process receives as input a stream of data, or a data structure, that was generated by the client to be sent to a network resource.

Figure 10:
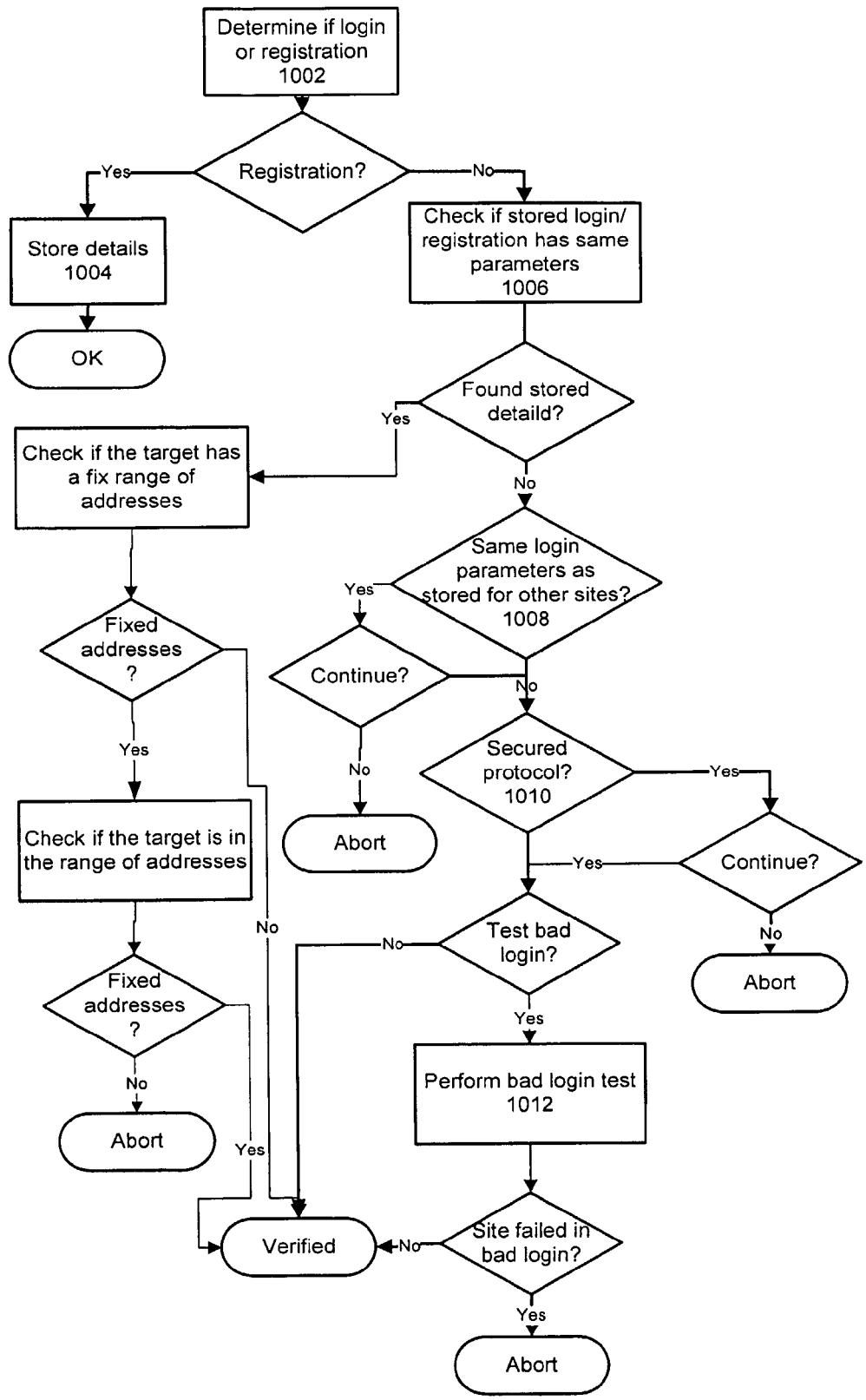
FIG. 10 is a flowchart for handling output of passwords in accordance with a preferred embodiment of the present invention.

Step 902 formats the stream of data to data elements (if this was not done before). The format process distinguishes between data elements and assigns data type to each element. The process continues according to the different data types as follows:

Step 904 shows that if a data element is a valid credit card number, a validation process is executed. The process includes the following:
 (a) If the protocol used between the client and the network resource is not encrypted, the transfer of data may be considered insecure.
 (b) If the network resource did not send a certificate or the certificate was not verified in step 742 as valid and trusted the transfer of data may be considered insecure
 (c) If the rating of the site owner as defined in step 734 does not match criteria defined for financial transaction, the transfer of data may be considered insecure Step 906 is a process executed if a data element is a password. Password handler process as described in FIG. 10 is executed.

Step 908 is a process that checks confidential data. The process may use one or more of the following:
 (a) Check each data item against a list of confidential information items and find matches
 (b) Automatically determine specific formats of data as confidential (e.g., data near fixed text describing confidential information like credit card number, social security number etc.)
 (c) Ask the user to mark confidential information When confidential information is detected there are several options that may be used:
 (a) For confidential data that were stored when the user entered it (step 1108) reconstruct the correct data to be sent from the data displayed and/or the stored data
 (b) For specific confidential information set a warning (e.g. a social security number should have a warning that this information should be disclosed only to employer and banking authorities)
 (c) Check rating of the site owner as defined in step 734 (FIG. 7). If the rating does not match criteria defined for disclosing confidential information, the transfer of data may be considered insecure
 (d) If the protocol used between the client and the network resource is not encrypted, the transfer of data may be considered insecure.
 (e) If the network resource did not send a certificate or the certificate was not verified in step 742 (FIG. 7) as valid and trusted the transfer of data may be considered insecure In all the steps above, when the transfer of data is considered insecure, one of the following policies is used:
 (a) The client user is notified and he should manually choose to allow the transfer of data or to abort it
 (b) The client user is notified and the transfer of data is automatically allowed
 (c) The client user is notified and the transfer of data is automatically aborted
 (d) The transfer of data is automatically allowed
 (e) The transfer of data is automatically aborted FIG. 10 is a flowchart that describes the process of handling output of passwords 908 (FIG. 9). The process may include one or more of the following steps:

Step 1002 includes determining if the process is registration or login to a site. Registration means that the user defines a new password that will be used to access the network resource in subsequent access. Login means providing a password known to the user for accessing a network resource. Methods to distinguish between registration and login include:
 (a) previous knowledge that the page is used for registration or for login
 (b) asking the user
 (c) Locating two password fields, near one of them the text "verify" or a variation of it may be displayed
 (d) Specific terms in the page can be used to detect that it is registration
 (e) Specific terms in the page can be used to detect that it is a password If a registration is detected, step 1004 is executed. In this step the process stores the details of the password used, optionally storing additional parameters like user name. The network resource is also stored.

If login is detected, steps 1006-1012 are executed. The steps hereafter may be executed in any order.

Step 1006 checks in the local storage whether the network resource had been used for registration or login before and login parameters (password and optional other parameters) are the same. In the case that there was such a login, the program approves the password.

Step 1008 checks whether the network resource had been used for login or registration with the same parameters and another network resource was accessed for login or registration with the same password and optionally other parameters. When the result is positive, the process may alert the user to this, it may list the sites that the login parameters were used and may ask for confirmation to use the password.

Step 1010 detects if the protocol used for sending the password is secure. If the protocol is not secure then if the network resource belongs to a list of network resources that requires secure login, use one of the following options:
 (a) alert the user that he should use a secure login, let the user decide if he prefers secure login or to proceed without secure login
 (b) alert the user that he should use a secure login, abort the transfer
 (c) automatically switch to the secure login session and optionally transfer the parameters already used to that page Step 1012 is used to test that the login is sent to a trusted network resource and not a scam server. The test may be confirmed by the user or may automatically be executed. The test includes a series of one or more logins with same and different passwords and optionally other parameters (like user name). The real parameters are part of the sequence of tries. The network resource should reject the wrong login access and accept only the correct one. If this is not the case the network resource is suspected as distrusted.

Figure 11:
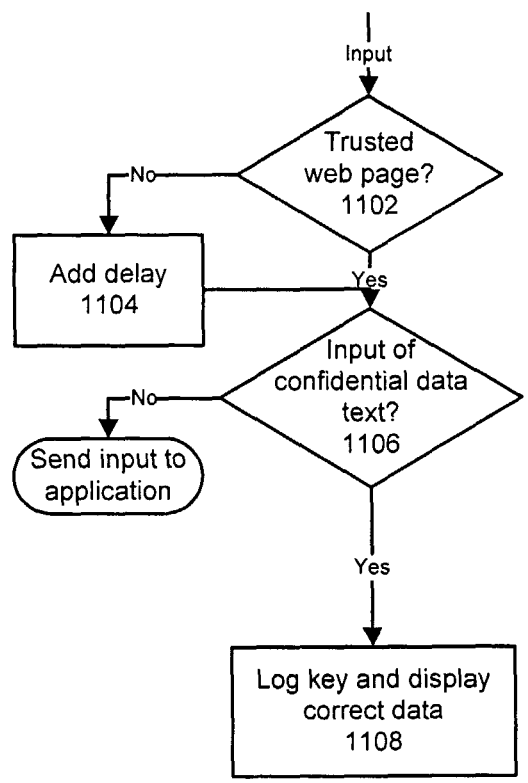
FIG. 11 is a flowchart of an input device manager in accordance with a preferred embodiment of the present invention.

FIG. 11 is a flowchart of input device manager (610) in accordance with a preferred embodiment of the present invention. The input device manager process is performed when an input is received from the input device 202. The process may not do anything (e.g., let the input be processed normally) or it may execute one or more of the functions described here.

In step 1102 the process determines the trust rating parameter of the calling ID of the network resource in the page to which the input should be sent. Based on the page and its rating the process may decide to add a random delay (step 1104) before transferring the input to the application.

In step 1106 the process checks if the place on the page that the input is targeted may contain confidential information. If the place may contain confidential information and the input is text, the process 1108 may log the input in a temporary storage to be used later by step 908, display the result of the input in the page, but not transfer the input to the application program 304.

The invention claimed is:

1. In a network comprising a plurality of network resources and at least one directory server, the directory server containing information with a predetermined level of trust about the network resources, a method for automatically providing a user's device with information about a network resource in communication with the user's device, the method comprising:
   detecting whether or not an identity of an owner of information in the network resource in communication is identified at the at least one directory server, and if the identity is identified, automatically retrieving the identity of the owner of the information in the network resource in communication from said at least one directory server;
   evaluating the identity of the owner of the information in the network resource in communication to determine trust-related information about the network resource in communication;
   automatically providing the user's device with information about the network resource based on the identity of the owner and according to trust-related information about the network resource in communication;
   wherein said at least one directory server comprises at least one security server, which detects whether a network resource leaves confidential information exposed, the detection comprises:
   using global network search engines and algorithms to find objects on the network resource that reveal credit card numbers, social security numbers, passwords connected to users names, personal identification numbers, ID numbers or other confidential information;
   analyzing the objects found and, if any of the objects expose confidential information, indicating that about the network resource;
   trying to access a restricted application on the network resource using techniques for cracking username and password protections; if successful in accessing the application, and if the application includes confidential information, indicating that about the network resource;
   getting reports from other network resources regarding whether a network resource, an object on that network resource, or a certificate of that network resource is a scam and recording that about the network resource; and
   scanning directory servers to find conflicts between different attributes of a network resource and, if found, recording that about the network resource.

2. The method of claim 1, wherein the method is implemented by a program installed on a processing unit of the user device.

3. The method of claim 1, wherein the method is implemented by a program installed on a processing unit of said at least one directory server.

4. The method of claim 1, wherein the method is implemented by a program installed on a processing unit connected to the network.

5. The method of claim 1, wherein the network resource in communication is an end point communication entity.

6. The method of claim 5, wherein the retrieved information relates to some or all of the associated network resources.

7. The method of claim 1, wherein the information about the network resource in communication is received from the network resource.

8. The method of claim 1, wherein the network resource in communication comprises an address for receiving messages.

9. The method of claim 1, wherein the network resource in communication is a web site.

10. The method of claim 1, wherein the user device or the network resource in communication is a telecommunication device.

11. The method of claim 1, further comprises providing the user's device with a choice whether or not to continue communication with the network resource in communication.

12. The method of claim 1, further comprises denying further communication between wherein the user's device and the network resource in communication.

13. The method of claim 1, wherein said at least one of the set of predetermined actions comprises providing the user device with a choice whether or not to continue communication with the network resource.

14. The method of claim 1, wherein evaluating the retrieved information to determine trust-related information concerning the network resource in communication is based on one or more parameters relating to the network resource in communication.

15. The method of claim 14, wherein said one or more parameters are selected from a group including: communication protocol; security level of the communication protocol; data received from the network resource in communication; type of information requested from the network resource in communication; physical location of the network resource in communication; owner information of the physical location and of the network resource in communication; information on the owner; name of the network resource in communication; inconsistency in information relating to the owner; status of any security certificates associated with the network resource in communication; history of the owner; information security problem related to the owner.

16. The method of claim 1, further comprising providing the user device with the trust-related information.

17. The method of claim 1, wherein the trust-related information comprises a trust rating of the network resource in communication.

18. The method of claim 17, further comprising adjusting the trust rating when the owner of the network resource in communication is changed during the communication.

19. The method claim 1, further comprising evaluating the reliability of the directory server.

20. The method of claim 1, wherein said at least one of the set of predetermined actions comprises denying further communication between the user device and the network resource in communication.

21. The method of claim 1, wherein the retrieved information includes one or more parameters relating to the network resource in communication.

22. The method of claim 21, wherein said one or more parameters are selected from a group including: communication protocol; security level of the communication protocol; data received from the network resource in communication; type of information requested from the network resource in communication; physical location of the network resource in communication; owner information of the physical location and of the network resource in communication; information on the owner; name of the network resource in communication; inconsistency in information relating to the owner; status of any security certificates associated with the network resource in communication; history of the owner; information security problem related to the owner.

23. The method of claim 1, wherein said at least one directory server comprises a plurality of directory servers, at least one of which contains information about the network resources characterized as being at least one of the following: domain Name Server; whois server; RIPE server; white pages server; yellow pages server.

24. The method of claim 1, further comprising: prior to sending data from the user device to the network resource in communication, evaluating the data to determine if sending the data to the network resource complies with security criteria.

25. The method of claim 1, further comprising if the type of data comprises confidential data, providing the user device with a choice whether to send the data or not.

26. The method of claim 24, further comprising sending test data consisting of incorrect information and verifying according to a response from the network resource if it is safe to send the data.

27. The method of claim 1, further comprising:
prior to sending data from the user device to the network resource in communication, evaluating the data to determine if sending the data to the network resource complies with criteria about commercial or rating of the network resource.

28. The method of claim 1 further comprising comparing information received from a plurality of directory servers regarding the network resource in communication and, if the comparison finds conflicting information, performing at least one of the following:
reporting differences in the conflicting information;
disregarding the conflicting information;
deciding which of the conflicting information to use based on a predetermined algorithm;
let a user of the user device decide which of the conflicting information to use;
using information from all the directory servers, including the conflicting information;
retrieving data from other directory servers about an issue to which the conflicting information relates.

29. In a network comprising a plurality of network resources and at least one directory server, the directory server containing information with a predetermined level of trust about the network resources, a system for automatically providing a user device with information about a network resource in communication with the user device, the communication including address information about the network resource, the system comprising:
a processing device for detecting whether or not an identity of an owner of information in the network resource in communication is identified at the at least one directory server, and if the identity is identified, automatically retrieving the identity of the owner of the information in the network resource in communication from said at least one directory server; for automatically providing the user's device with information about the network resource based on the identity of the owner and according to trust-related information about the network resource in communication;
evaluating the identity of the owner of the information in the network resource in communication to determine trust-related information about the network resource in communication;
wherein the network resource in communication is a web site;
wherein said at least one directory server comprises at least one security server, which detects whether a network resource leaves confidential information exposed, the detection comprises:
using global network search engines and algorithms to find objects on the network resource that reveal credit card numbers, social security numbers, passwords connected to users names, personal identification numbers, ID numbers or other confidential information;
analyzing the objects found and, if any of the objects expose confidential information, indicating that about the network resource;
trying to access a restricted application on the network resource using techniques for cracking username and password protections; if successful in accessing the application, and if the application includes confidential information, indicating that about the network resource; getting reports from other network resources regarding whether a network resource, an object on that network resource, or a certificate of that network resource is a scam and recording that about the network resource; and scanning directory servers to find conflicts between different attributes of a network resource and, if found, recording that about the network resource.

30. The system of claim 29, wherein the processing device further provides the user's device with a choice whether or not to continue communication with the network resource in communication.

31. The system of claim 29, wherein the processing device further denies further communication between wherein the user's device and the network resource in communication.

* * * * *